(12) United States Patent
Johnson et al.

(10) Patent No.: US 7,933,854 B2
(45) Date of Patent: Apr. 26, 2011

(54) RULE BASED SYSTEM AND METHOD

(75) Inventors: Peter Ross Johnson, Barton (AU);
Thomas Johnston Reid, Barton (AU);
Andrew Barry, Barton (AU)

(73) Assignee: RuleBurst Limited (AU)

( * ) Notice: Subject to any disclaimer, the term of this patent is extended or adjusted under 35 U.S.C. 154(b) by 809 days.

(21) Appl. No.: 10/592,102

(22) PCT Filed: Mar. 8, 2005

(86) PCT No.: PCT/AU2005/000318
§ 371 (c)(1),
(2), (4) Date: Dec. 6, 2007

(87) PCT Pub. No.: WO2005/086037
PCT Pub. Date: Sep. 15, 2005

(65) Prior Publication Data
US 2008/0215517 A1     Sep. 4, 2008

(30) Foreign Application Priority Data

Mar. 8, 2004   (AU) .............................. 2004901169

(51) Int. Cl.
*G06F 17/00*     (2006.01)
*G05N 5/02*      (2006.01)

(52) U.S. Cl. ......................................................... 706/47
(58) Field of Classification Search ..................... 706/47
See application file for complete search history.

(56) References Cited

U.S. PATENT DOCUMENTS 7,287,016 B2 * 10/2007 Johnson et al. ................. 706/47
7,418,434 B2 * 8/2008 Barry .............................. 706/47

* cited by examiner

*Primary Examiner* — Michael Holmes
(74) *Attorney, Agent, or Firm* — Kilpatrick Townsend & Stockton LLP

(57) ABSTRACT

A rule based computerized method is disclosed of developing and/or implementing and/or administering rule based systems such as legislation and/or policy and/or other rule sets, the method including: -developing a computerized database containing a set of rules in accordance with which the rule based system can be developed, written in and delivered; wherein the rules are: -written in natural spoken language to express the individual grammatical units constituting the rules, constrained in being written in accordance with defined constraints to limit the number of logical formats in which the rules can be expressed, and explicit in being written in a manner to avoid implicit meanings; whereby the rules are expressed in a logical format readily understandable to both humans and computers.

21 Claims, 4 Drawing Sheets

RULE BASED SYSTEM AND METHOD

This Application claims the benefit under 35 U.S.C. §371 of International Application No.: PCT/AU2005/000318 (published PCT application No. WO 2005/086037 A1), filed Mar. 8, 2005, which claims priority to Australian Application 2004901169, filed Mar. 8, 2004; the entire contents of each of the above-referenced applications are incorporated herein by reference.

TECHNICAL FIELD

This invention relates to rule based systems and methods.

The invention has particular but not exclusive application to rule based systems and methods of developing, implementing and administering legislation, and particularly to writing legislation. However it will be appreciated that the present invention can be used in other rule based applications such as policy development, implementation and administration.

As used herein the expression "rule based" is to be given a broad meaning. Rule based systems and methods are ones which are developed and implemented, and which operate, in accordance with a set of rules. The rules may be declarative, i.e. they explain rather than pronounce, or they may be procedural.

BACKGROUND OF INVENTION

It is of course known for systems and methods to be developed in accordance with a set of rules. It is also known for existing legislation to be analysed using computerised databases built on a set of rules.

Our previous International Patent application PCT/AU02/01380 describes one such system and the description and contents thereof are incorporated herein by reference.

In general terms it may be said that this earlier application describes a rule based computerised method of drafting legislation which includes a set of legislative drafting conventions and an XML schema incorporating those conventions. The process develops a computer system containing a set of declarative rules in accordance with which legislation can be written and uses this system to write legislation where the declarative rules correspond to acceptable legislation, where the declarative rules constrain the drafting to a strict logical structure, and where the agreed drafting conventions are incorporated in an XML schema.

The earlier patent outlines a system that provides further editing support when drafting to facilitate the use of the drafting conventions; that creates a legislative parser to convert the draft legislation to XML to verify conformance with the drafting conventions and report any failures; that creates facilities to import the parsed legislation into a pre-existing rule base technology to create a rule base, and that creates a testing methodology so that the drafter can test the legislation against cases.

A computer system for writing legislation is described in our earlier application which includes a database of the declarative rules and a program for executing those rules, wherein the rules are written in a format corresponding to acceptable legislation using a set of agreed drafting conventions which constrain the logical structure, and wherein the system uses an XML schema incorporating the drafting conventions.

SUMMARY OF INVENTION

The present invention aims to provide an alternative to known rule based systems in general and to methods for developing, implementing and administering legislation in one particular embodiment.

In several aspects the present invention resides broadly in inventive extensions or additions to various aspects of the invention of the earlier patent application.

In general terms, in one aspect the present invention relates to an extended set of logical principles or rules governing a drafting process which includes procedural rules as well as declarative rules. One embodiment of these extended rules is described subsequently as the Constrained Explicit Logic Format (CELF).

In general terms, in another aspect the present invention relates to parsing the resulting normalised structures in the draft legislation (or compliant transformations of existing legislation as described below) whether through the use of an XML schema or not. In particular, in this aspect in the present invention means other than XML schema are utilised to parse the draft legislation (or transformations) in order to verify compliance with a set of normalising rules, and in order to generate a rule base.

In general terms, in another aspect the present invention relates to an automatically generated rule base to facilitate the identification of errors in draft legislation by means of automated and semi-automated validation processes, rather than utilising case-based testing to verify the accuracy, consistency and completeness of the rule base. This can be described as Legislative Quality Assurance.

In general terms, in another aspect the present invention relates to a method of using normalising principles (such, for example, as the declarative rules described in the earlier patent application) as a drafting technique, whether computer based or not, to produce draft legislation which can then be parsed to test conformance to the principles.

In general terms, in another aspect the present invention relates to computer based transformation of existing legislation into a form having normalised representation of logical structures and operators, the transformation using the same set of normalising rules used for drafting the legislation to thereby automatically generate rule bases from existing legislation, or from a transformed natural language representation thereof. In other words, this aspect of the present invention facilitates the automatic creation of a computer-executable rule base from existing legislation or when drafting new legislation.

In general terms, in another aspect the present invention relates to using the above techniques to describe and represent rule-based material for other than legislative rule bases, the rule based material having rules expressible in natural language such as, for example, policy or process rules which comply with the constrained normalised format, and automatically generating a rule base therefrom.

In general terms, in another aspect the present invention relates to a method of automatically generating rule bases from a plurality of varied sources or applications by utilising a single set of conventions for the representation of a logic underpinning of all of these by unifying the generation of rule bases from all of these sources.

In general terms, in another aspect the present invention relates to automatically parsing the natural language statements in the draft, such as for example legislation or policy or the transformation of existing legislation, to automatically generate the grammatical forms required to investigate and report on the application of the draft. This grammatical parsing of natural language substantially enhances the utility of generated rule bases and automatically ensures that rule bases so generated can be used transparently and coherently, and contrasts with the logical parsing of the earlier application which tested conformance to a set of drafting rules or principles, and generated a rule base from the material.

In general terms, in another aspect the present invention relates to a standard automated method of rating the complexity of legislation. Furthermore, in another aspect the present invention will be seen to relate to the utilisation of a set of declarative and/or procedural rules in various applications including the drafting of new legislation, the transformation of existing legislation so as to enable automatic generation of rule bases, and the drafting of policy or other natural language rules, wherein the set of principles governing the rules evolves adaptively.

Accordingly, the present invention in its several aspects variously:

drafts legislation in a form that can be virtually immediately executed on a computer ("programmatic legislation" or "executable legislation"—the Constrained Explicit Logical Format or "CELF" is one example);

transforms existing legislation into a form that has normalised representation of logical structures and operators, so that it can also be executed on a computer (again, CELF is one example);

is such that these formats are not in a symbolic or abbreviated format, but use complete natural language reflecting the precise terms of the legislation;

provides so-called CELF Principles, which apply both to the drafting of new legislation and to the transformation of existing legislation, and which can be extended to encompass increasingly diverse logical forms and structures;

provides an extended set of CELF principles based on a set of procedural operators (rather than declarative operators), which could be called the Constrained Explicit Procedural Format;

automatically parses the natural language statements in the normalised form so as to be able automatically to generate all grammatical forms required to investigate and report on the application of the legislation (positive, question, negative, possibility, and both imperative forms);

automatically parses the CELF structures to identify the logical structures of the rules, and to automatically create a rule base from these rules, which can be executed by an inference engine;

utilises the same technique of a normalised, constrained set of logical structures and operators to describe other forms of rules (policy rules, process rules or whatever) in a natural language form, from which a rule base can be automatically generated ("executable policy");

utilises a single, diverse and flexible set of conventions for the representation of logic underpinning all of these various techniques for the automation of rules from different sources;

utilises an automatically generated rule base to help identify errors in the drafting process by using automated and semi-automated tools, and provides a standardised, highly automated method for rating the complexity of legislation.

At one level the present invention is thus seen to relate to a rule based method of developing and/or writing and/or implementing and/or administering executable policy and/or executable legislation including at least one of the inventive steps identified above and to be subsequently described in more detail.

The invention also relates to a computer program embodied on a machine readable medium that operates such method or methods.

At another level the present invention is seen to relate to an extended inventive set of logical principles or rules, a preferred embodiment of which is described subsequently as the Constrained Explicit Logic Format (CELF).

At yet another level the present invention is seen to relate to the inventive use in various applications of automatically generated rule bases.

Accordingly, the present invention in one aspect resides broadly in a rule based computerised method of developing and/or implementing and/or administering rule based systems such as legislation and/or policy and/or other rule sets, the method including:

developing a computerised database containing a set of rules in accordance with which the rule based system can be developed, written in and delivered;

wherein the rules are:

written in natural spoken language to express the individual grammatical units constituting the rules, constrained in being written in accordance with defined constraints to limit the number of logical formats in which the rules can be expressed, and explicit in being written in a manner to avoid implicit meanings;

whereby the rules are expressed in a logical format readily understandable to both humans and computers.

The constrained and explicit rules are preferably such that:

the grammatical syntax and semantics of a determinative legislative, policy or rule set provision explicitly reflect an underlying logical structure in a particular and preferred form, and the syntax of legislative, policy or rule set provisions used for calculating amounts or quantities explicitly reflects calculations and algorithms that have a particular and preferred syntactic structure.

The method may also include utilising the computerised database to develop draft policy for the legislation, policy or rule sets of a rule based system in accordance with the set of constrained and explicit rules, and/or utilising the computerised database to write draft legislation, policy or rule sets in accordance with the set of constrained and explicit rules. In this embodiment the method can further include utilising the computerised database to parse the draft written in accordance with the constrained and explicit rules to check compliance of the draft therewith.

The method may also include utilising the computerised database to automatically transform existing legislation, policy or rule sets of a rule based system into a format consistent with the constrained and explicit rules. In this embodiment the method can further include automatically generating a rule base from the existing legislation, policy rule set, or from a transformed natural language representation thereof.

The constrained and explicit rules are preferably developed in accordance with at least some of the principles for determinative provisions and principles for calculations substantially as described herein.

DESCRIPTION OF DRAWINGS

In order that this invention may be more easily understood and put into practical effect, reference will now be made to the accompanying drawings which illustrate a preferred embodiment of the invention, wherein.

DESCRIPTION OF PREFERRED EMBODIMENT OF INVENTION

Figure 1:
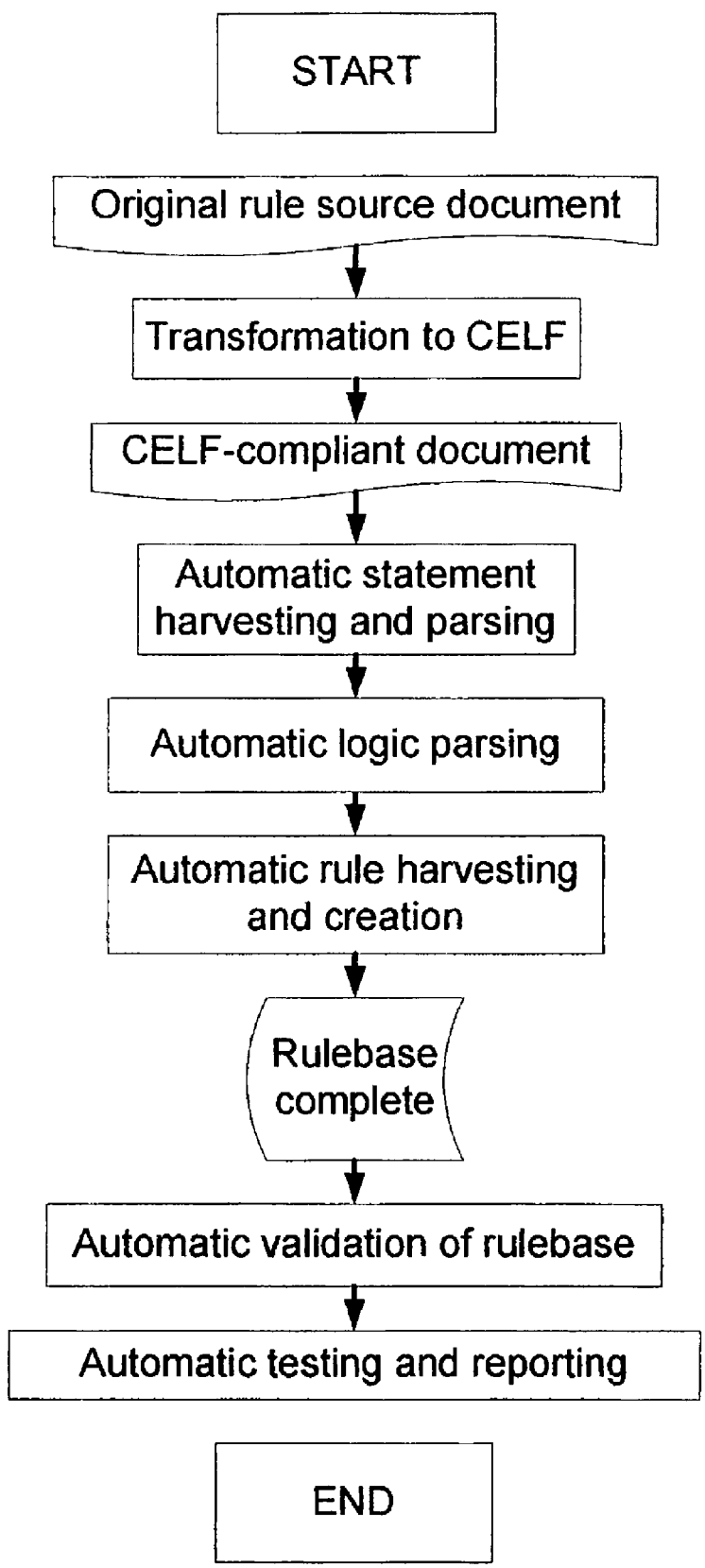
FIG. 1 is a flowchart diagram illustrating the present invention as applied to a rule based method of developing legislation where the original rule source document is not compliant with CELF.

In general terms it will become apparent that central to the present invention are broad principles that can be used to transform or create a body of documented rules that are constrained and explicit in their expression of the meaning of those rules. This allows rules to be structured in such a way that is both straightforward for a human to understand and amenable to conversion by a computer into a form that can be executed and manipulated by a computer. The constrained explicit logical format (CELF) subsequently to be described is a set of such principles.

An extension of this broad aspect is the use of natural language to express the individual grammatical units that make up the rules. This extension provides the same benefits but with an expression of the rules in fully natural, or near-natural, language. This improves the readability of the rules by humans but without compromising computer access.

An example of the type of constraint that can be applied is to only allow:
  Conclusions to be linked to premises using "if"
  Premises to be linked by "and" or "or"
  Premises to be negated using "not"

This type of constraint restricts the basic form of logical expression to something that is consistent and simple to understand, preventing more florid forms that can be difficult for both humans and computers to interpret.

An example of the type of explicitness required is the principle governing the "comprehensive statement of premises". This states that it is essential that a conclusion is followed by a comprehensive statement of:
  all conditions for success or failure of that conclusion; or
  clear references in the premises to any sub-conclusions that appear separately.

This means that everything that proves a conclusion is clearly listed with the conclusion, avoiding any implicit conclusions or the need to digest the entire body of rules to understand what contributes to a single conclusion. Again, this not only better enables computer conversion but also significantly increases the readability of the rules for humans.

Turning now to a more detailed description of the present invention in one of its preferred embodiments of developing legislation, there is described the creation of a set of rules that can be executed on a computer from one of three sources:
  from a document in natural language that describes in natural language the rules that are contained within legislation; or
  from legislation directly; or
  from a document in natural language that describes rules from any other source.

These three capabilities are generically referred to herein as Executable Legislation and Policy.

As used throughout this specification certain words and expressions are to be understood to have the following meanings:

legislation—when the specification refers to legislation, this includes any articulation of policy on any subject (as the techniques apply equally to policy), as well as formal legislation;

a set of rules—this refers to any body of rules, whether they describe formal logic or mathematical calculations;

encapsulating the logic of the legislation—this refers to an accurate and precise representation of the logical forms that the legislation specifies, whether the actual language of that representation is more constrained than the legislative representation or not;

in a form that can be executed on a computer—this refers to any form of rules that are able to be executed directly or by a second piece of software (such as an inference engine);

while retaining the full semantic richness—this refers to the preservation of the actual language of the legislation in the rules, rather than any form of symbolic or abbreviated representation of the general effect of that legislation.

Rapid Creation of Rule Bases from Legislation

In the basic process of the present invention, there is rapidly created from legislation a set of rules that encapsulate the logic of the legislation in a form that can be executed on a computer, while retaining the full semantic richness of the legislation.

The following steps are involved in the basic process of rapidly creating a rule base from legislation:
  the content and logic of the legislation is transformed into a set of rules that reflect the language of the legislation but that use a normalised set of structures and logical operators;

then, (not necessarily in this order):
  individual legislative statements in the transformation are automatically parsed grammatically whereby the appropriate question, negation or other forms can be generated from each base statement, and
  the logic of the transformed legislation is automatically parsed whereby declarative or procedural rules are created in a form that can be executed by another piece of software, such as an inference engine.

Performance of these three steps delivers executable rules which are immediately usable for investigation and application of the legislation to factual or testing situations.

It is useful to refer at this point to FIG. 1 which is a flow chart representing a process by which non-CELF-compliant rules can be converted into a normalised format (CELF) and then automatically converted into a rulebase to be subsequently validated and tested.

The steps in this process are as follows:

(1) The first step is to transform the content and logic of a source document (whether it be legislation, policy or process rules) into the Constrained Explicit Logical Format. This process involves applying the principles described under "Principles for Determinative Provisions" (as subsequently described on page 14) and "Principles for Calculations" (as subsequently described on page 16), or any expanded version of these same principles. For example, each logical premise would be made into a full grammatical unit, implicit linkages between sections would be made explicit, and so forth. The product of this process, a CELF-compliant document (whether a text document or other representation suited to the subject matter, such as a flow chart), retains the full semantic richness of the source material while using a normalised set of structures and logical operators.

(2) Once the CELF-compliant document has been produced, a procedure (such as a macro or other program) can be run over the document to automatically harvest each individual statement contained in the document and to create a positive, negative, uncertain and question form of each statement.

(3) During or after the process of extracting the statements from the CELF-compliant document, the logic of the document can also be analysed. Again a procedure (such as a macro) can be run over the CELF-compliant document which recognises the CELF standard structures and logical operators. (It should be noted that rules from multiple CELF-compliant documents can be stored in a single rule base and that a rulebase is not necessarily created for each document.)

(4) Using the information from the analysis of the structural logic, the harvested statements can be linked together into rules. This completes rule harvesting and creation. This process creates the rule base.

(5) The rule base can then be subjected to a series of automatic validation tests. Some examples include the ability to test whether looping occurs in the linkage between rules, or whether a logical link has failed to be made.

(6) The rule base can also be used to test outcomes of a series of real-life scenarios. That is, based on threshold values in the rulebase or on real-world data, scenarios can automatically be created, that data can be run against the rulebase using an inference engine and outcomes can be returned. These outcomes can be used for statistical reporting purposes, such as reporting average or anomalous outcomes.

(7) These scenarios can also be used to give the rulebase a complexity rating. The complexity rating is based on, and a combination of:

(a) Factual complexity—the number of questions required to be answered in order to reach a conclusion.

(b) Interpretative Difficulty—a rating for the difficulty of answering each question so as to give a weighting to factual complexity.

(c) Logical Complexity—the number of logical steps required to reach a conclusion.

Each scenario can have a different complexity rating. The lowest, highest and average complexity ratings across all scenarios are then used to provide a report on the relative level of complexity of the logical structure supporting a particular goal.

Drafting Legislation for Execution (Programmatic Drafting)

The utilisation of the above basic approach to the extended process of drafting legislation for execution, referred to here as programmatic drafting, provides a method for drafting legislation in a form that enables the automatic and direct creation of a set of rules, encapsulating the logic of the legislation, in a form that can be executed on a computer, while retaining the full semantic richness of the legislation.

This method includes the use by legislative drafters of the constrained set of conventions for representing logical structures and operators. Furthermore, the transformation step described above is rendered unnecessary, because the legislation is already drafted in the normalised form, with a consistent and predictable use of logical structures and logical operators. The legislation can therefore be parsed immediately by a software program to create the statements and rules.

Figure 2:
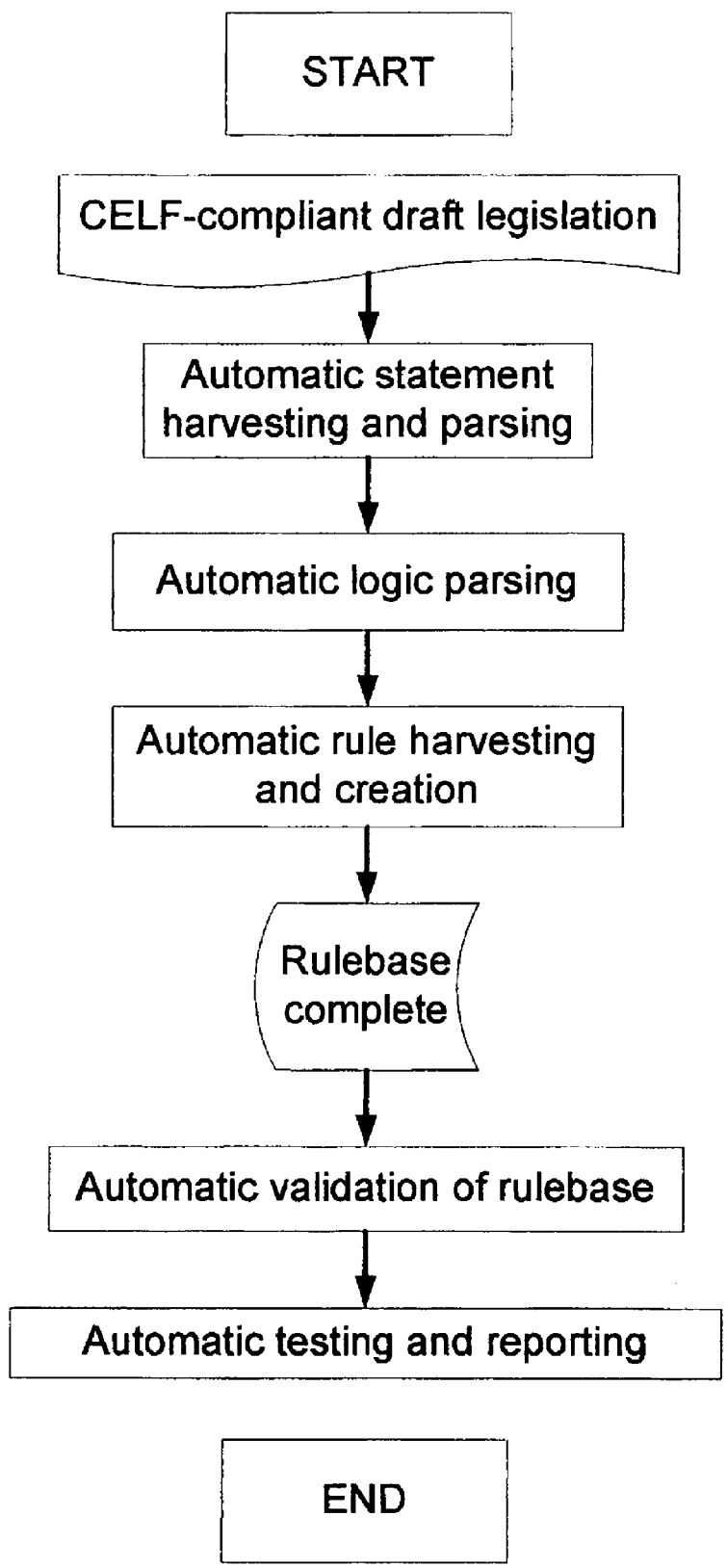
FIG. 2 is a flowchart diagram illustrating the present invention as applied to a rule based method of developing legislation where the original rule source document is CELF-compliant.

With reference now to FIG. 2 which is a flow chart illustrating a process in which the source document is drafted in accordance with the CELF principles. Thus FIG. 2 is seen to be similar to FIG. 1 except that step 1 as described above is replaced by a step in which the source document is drafted in accordance with the CELF Principles described herein, or an expanded version of these principles. In this case, transformation is not required as the drafted source material will be consistent with the CELF principles. In this diagram the source material is specifically legislation, whether in draft form or enacted.

Using an Automatically Generated Rule Base to Test for Drafting Errors (Dynamic Testing)

As described in step (6) above with reference to FIG. 1, utilisation of the above basic approach to the extended process of utilising an automatically generated rule base to test for drafting errors, referred to here as dynamic testing, enables a series of automated and semi-automated checks and tests to be performed rapidly on the legislation. At present, it is largely impossible for a drafter to test draft legislation despite the fact that legislation is often a large and complex body of logic.

The tests include fully automated internal validation checks for issues such as consistency, looping etc., semi-automated checks which identify certain logical structures that may be problematic, or automated case-generation and testing which identifies issues such as redundant provisions, universally true or false provisions, policy non-conformance and other errors.

The above approach provides an improved means of ensuring the logical consistency, comprehensiveness, avoidance of redundancy and policy conformance of the draft legislation and represents a new dimension to legislative drafting.

Furthermore, as described below, this capability is also applicable to policy which has itself been drafted in this manner.

Drafting Policy for Execution (Programmatic Policy)

The utilisation of the above basic approach to the extended process of drafting policy for execution, referred to here as programmatic policy, facilitates the preparation of policy of any form by the use of the conventions described above when drafting legislation using a constrained and predictable set of structures and logical operators.

This means that a structured description of policy using a natural language can serve as both the authoritative description of that policy, and the direct basis for executable computer systems that implement or apply that policy. The statement of policy is inseparable from, and may be identical to, the computer code that implements it.

Programmatic policy thus allows the full use of natural language in the description of policy criteria, while specifying the structure and operators that are to be used in representing logical relationships between policy criteria.

The automated testing capability described with reference to dynamic testing above is also applicable to programmatic policy.

Figure 3:
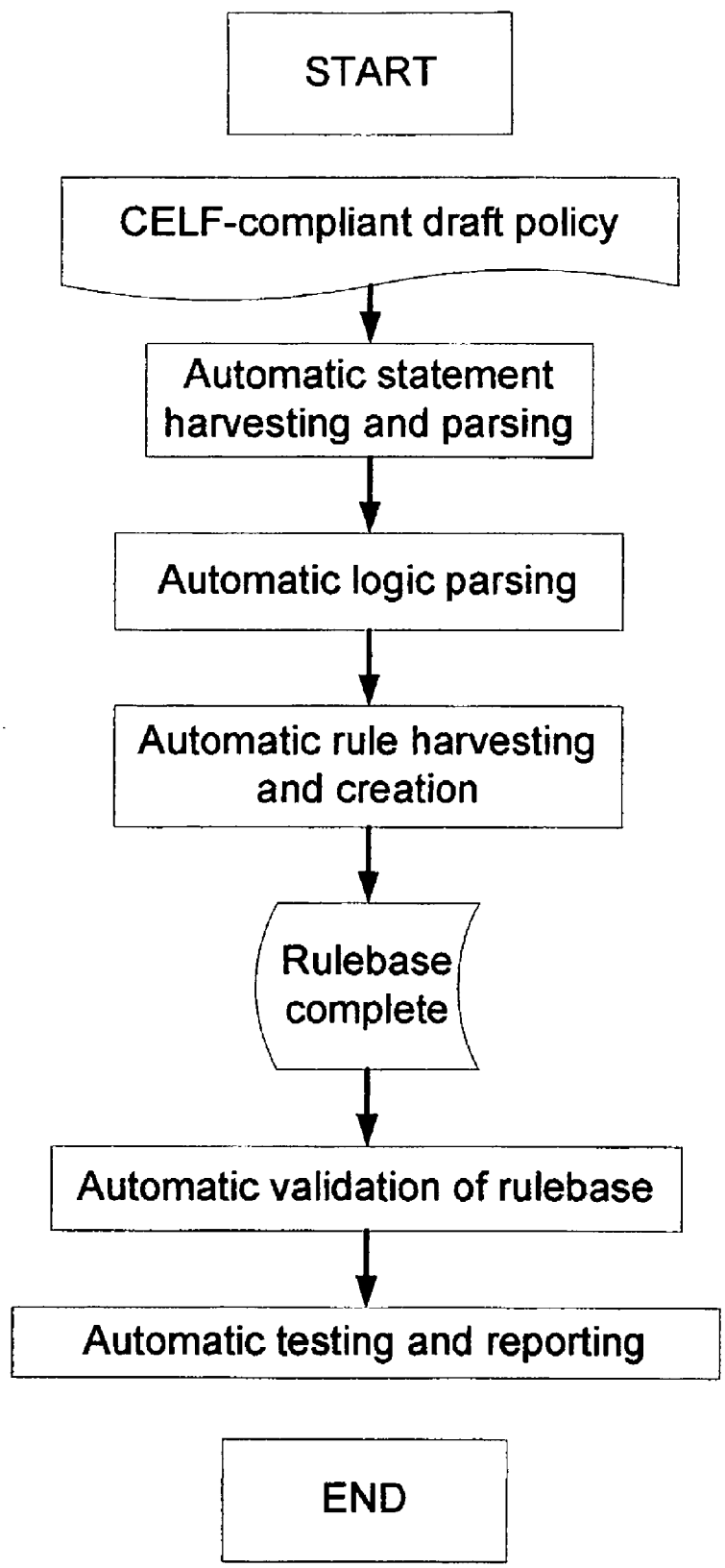
FIG. 3 is a flowchart diagram illustrating the present invention as applied to a rule based method of policy development where the original rule source document is CELF-compliant.

The flowchart diagram of FIG. 3 illustrates the process described above for policy rules. FIG. 3 represents the same process as described in FIG. 2, except that the source document that is drafted in step 1 is a policy document. FIG. 3 indicates that the same process that is used to draft legislation can also be used to specify policy rules.

Figure 4:
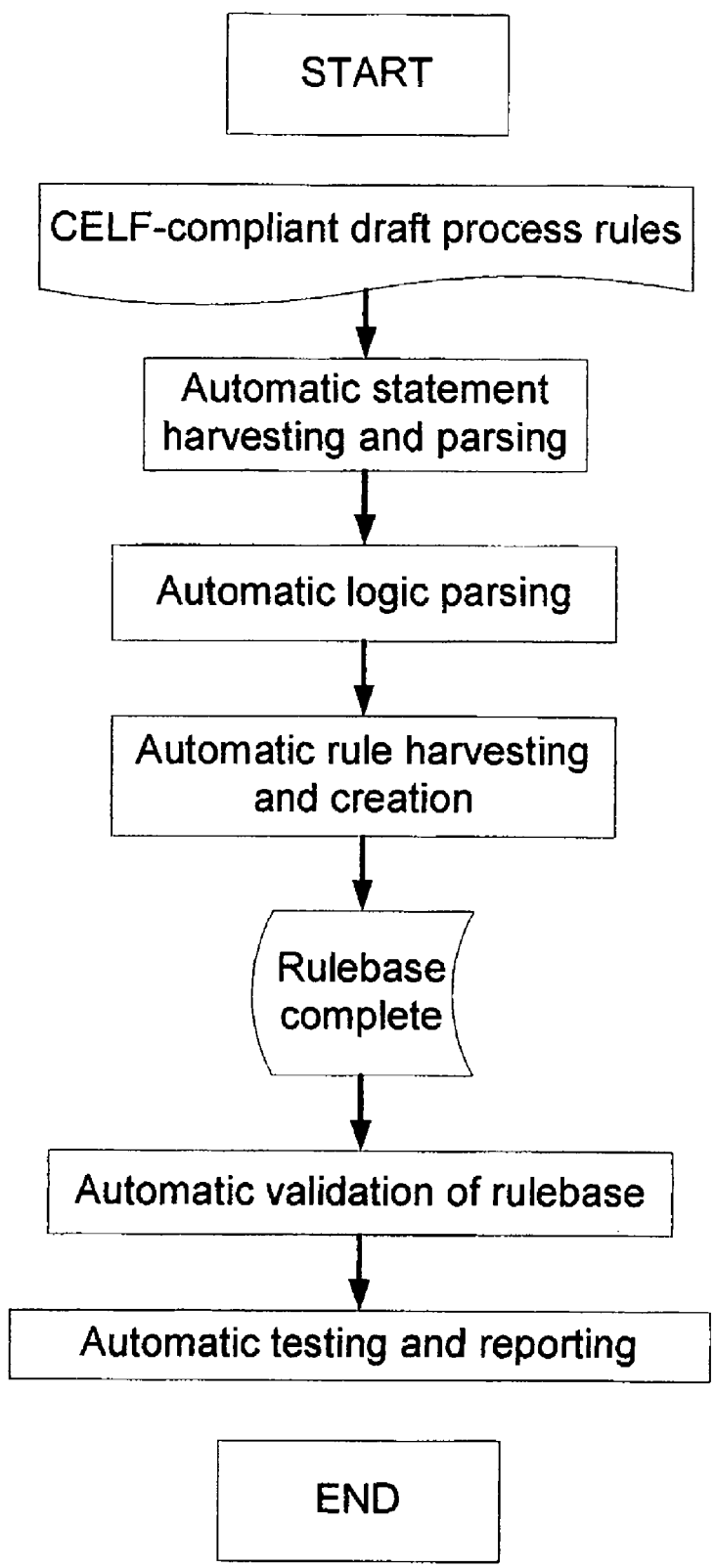
FIG. 4 is a flowchart diagram illustrating the present invention as applied to a rule based method of developing process rules where the original rule source document is CELF-compliant.

The flowchart diagram of FIG. 4 illustrates the process described above for process rules. FIG. 4 represents the same process as described in FIG. 2, except that the source document created in step 1 is process based. FIG. 4 indicates that the same generic process can apply to procedural rules, once the rules have been defined in an appropriate, constrained, predictable form.

Automated Assessment of Legislative or Policy Complexity

As described in step (6) above with reference to FIG. 1, utilisation of the above basic approach of automatically generating a rule base enables the complexity of the legislation or policy to be automatically, or largely automatically, measured against set criteria.

The rule base can identify, for any legislative outcome the number of facts that must be traversed for the simplest path, the most complex path or an average path through the legislation, and the number of logical steps that must be made for the simplest path, the most complex path or an average path through the legislation.

This provides a standardised "logical complexity rating" for the legislation or policy, which can be measured against other bodies of legislation or policy, and enables agencies to have a benchmark for assessing the difficulty of implementation, or the appropriateness of the legislation for its task. Each fact can be weighted to reflect the level of interpretative difficulty that its application entails (eg: the level of abstraction of the fact), to provide an enhanced complexity rating.

Constrained Explicit Logical Format (CELF)

There now follows an outline of the principles for producing legislation in the Constrained Explicit Logical Format, although as stated previously, it is to be understood that the principles outlined here in relation to a legislative drafting embodiment, are applicable in other applications. These are the principles applied in transforming the original document into a CELF-compliant document as described in Step 1 with reference to FIG. 1.

The general characteristics of this format are that the legislation is represented in a form that is:

Constrained—the drafting uses a limited and consistent set of structures and operators to represent logical constructs, rendering the structures and operators predictable;

Explicit—all logical steps and links in a logical stream are made explicit at the source of those steps; there are no implicit steps;

Declarative—logic is expressed declaratively, rather than procedurally (although this can be extended to include procedural syntax).

These characteristics are reflected in the three core principles of CELF, which provide some structure and context for lower level drafting principles. These core principles are:

The grammatical syntax and semantics of a determinative legislative provision explicitly reflect an underlying logical structure in a particular form.

The syntax of legislative provisions used for calculating amounts or quantities explicitly reflects calculations and algorithms that have a particular syntactic structure.

Provisions are framed in a declarative rather than a procedural form, although as indicated above, the provisions can also be framed in a procedural form.

These core principles identify that determinative legislative provisions will reflect a different underlying structure to that of calculation provisions. For this reason, the principles for those two types of provisions are specified separately below.

The scope of CELF is concerned with determinative legislation which involves complex sets of rules for working out a specific outcome. Determinative legislation is taken to include both determinative provisions and calculation provisions and deals with those provisions that form part of goal-directed logical networks or schemes of legislative provisions. The majority of legislative provisions fall into this category of determinative legislation, particularly in legislation elaborating people's complex rights and entitlements, such as benefits or tax legislation.

There are, however, legislative provisions in Acts that do not form part of such a network. Those provisions need not comply with CELF Principles. The following are some examples to illustrate non-determinative provisions:

provisions that set up a statutory office or agency;
provisions that state that regulations may be enacted on a particular point;
provisions that simply state penalties.

Principles for Determinative Provisions
Principle 1—Clearly Identified Conclusions Each determinative provision should have a clearly identifiable conclusion. There should only be one conclusion for each discrete clause (sub-section level).

The conclusion should be explicitly stated, rather than implicit.

The conclusion should appear first, unless there is a good reason for it to appear after the premises. The provision should therefore take the form:

The person is qualified for a pension if . . .

Principle 2—Clearly Identifiable Top Goal

There should be a clearly identifiable top goal or conclusion in a hierarchy of provisions.

Top goals should reflect the issues that a person seeking to apply the legislation to a set of circumstances would be likely to wish to investigate.

The top goal should appear at the start of a hierarchy, rather than other provisions such as definitions or application provisions.

Principle 3—Single Statement of Conclusions

The same conclusion should only be stated once. If there are multiple ways of proving a single conclusion, they should be grouped and referenced under that conclusion; there should not be multiple provisions proving the same conclusion.

Principle 4—Comprehensive Statement of Premises

In order to comply with principle 3, a conclusion should be followed by a comprehensive statement of:

all conditions for success or failure of that condition; or
clear references in the premises to a sub-goal for any such conditions.

This means, for example, that the following forms, which usually appear in separate provisions, must appear as premises or be referenced by premises:

Exceptions to a conclusion;
Deeming provisions that provide alternative paths to a conclusion.

This also precludes the use of legislation by reference (which takes the form . . . apply section 12, but as if . . . ).

Principle 5—Clearly Identifiable Premises

The premises in each determinative provision should be clearly identifiable.

The premises should be separate from the conclusion and separate from each other (rather than partially embedded in those other items).

The premises should be separate from and clearly joined by logical operators (rather than having those operators embedded in the premises).

At any level in the legislation, all premises must be joined by the operator AND or else all premises must be joined by the operator OR. In other words, premises at the same level should not be joined by a mixture of AND's and OR's.

There should be no use of the conditional form embedded within a clause. A conditional statement should either form a standard premise of a clause, or a separate provision should deal with that condition.

Paragraphs and sub-paragraphs should only be used for complete premises.

Principle 6—Use of Full Grammatical Units

Conclusions and premises should each use full grammatical units.

Provisions should appear in the following form:

The person is qualified for a pension if
(a) the person is over 60 years of age; and
(b) the person resides in Australia.

rather than the form:

The person is qualified for a pension if they:
(a) are over 60 years of age; and
(b) reside in Australia Principle 7—Constrained Use of Logical Operators Conclusions should be linked to premises by operators such as "if". (Note that because principle 3 calls for a single statement of any conclusion and principle 4 envisages the statement of all conditions for success or failure, the use of the operator "if" has the effect of "if and only if".)

Each premise should be explicitly linked to any following premises by the operators "and" or "or".

Premises can take the form of negative statements, using the negative operator "not".

Principle 8—Use of quantifiers

Language to express quantification needs to be unambiguous, especially where a proposition containing a quantifier is negated. It needs to be clear whether the proposition is referring to all, none or some but not all instances of the quantified variable.

Principle 9—Boundaries of Narrative and Reinstantiation of Variables

The boundaries of a continuous narrative need to be clear, both as to what is inside and what is outside the narrative field. Within a narrative field, a variable that has been instantiated cannot generally be re-instantiated, and this should be evident from the language (though use of the definite article or an identifying tag).

Provisions that operate as subroutines (especially definitions) should not be embedded in a narrative field (though they can interrupt the flow of a single narrative) and should never use variables that have already been instantiated within a narrative field. Instead they should have their own variables that can be re-instantiated for the purposes of the different narrative fields that call the subroutines.

Principle 10—Explicit Nesting

Links between the premise of one clause and the conclusion of another clause must be explicit.

This requires consistent use of terminology to identify unambiguous links.

One expression will be taken to have one meaning. Terms will therefore only be defined once in the enactment.

Principles for Calculations

Principle 1—Named Conclusions

Calculations must have a named numeric variable as the conclusion to be derived.

Principle 2—Grouping of Alternative Calculations

Where there are alternative methods of calculating a certain variable, the rules covering those alternative methods should be grouped together.

Where possible, a device such as a table should make it clear that the various calculations are alternative methods to derive values for the same variable.

Principle 3—Conclusion Always Defined

The conclusion must always exist. It must always be defined. This may require the inclusion of a default value such as nil if the conditions for the calculation are not satisfied.

Principle 4—Forms for Functions

Functions that define the method of calculating a variable should be specified in devices such as a method statement, a formula or a table.

Complex functions should not be specified in a purely textual form.

Principle 5—Completeness of Argument Values

A function must be defined for all possible values of its arguments, or any exceptions must be specified.

Principle 6—Completeness of Premises

The application rules must cover the universal set of possible values for the premises. For example, they should not simply cover the potential conditions for non-nil values of the conclusion variable.

Principle 7—Error-Trapping

The drafter must consider and explicitly trap potential errors:

Boundary conditions must be considered and covered for arguments and conclusion values. Any boundary conditions should be stated.

The function should generally evaluate to >=0, unless it is clear that the policy contemplates, and the calculation can sustain, negative values.

Appropriate rounding behavior should be considered and specified for arguments and conclusions, such as:
Significant figures or truncation;
Absolute values;
Money figures that should evaluate to more than two decimal places.

It will be appreciated that the present invention has a number of advantages over known rule based systems and methods. These include:

The process and approach to creating executable programs with high levels of integrity directly from legislation or policy.

The use of a process to transform legislative or policy logic and structures to a predefined constrained and predictable form, but in full natural language rather than any form of symbolic representation of logical relationships.

The drafting of legislation or policy in accordance with a predefined set of conventions for the representation of logic, so as to make its conversion to an executable form susceptible to automation.

The specification of predefined conventions for the representation of logic, whether used for legislative or policy drafting, or legislative or policy transformation. The Constrained Explicit Logical Format (which as described herein is one embodiment of the general concept extendable to cover procedural as well as declarative forms and operators) is an extensible declarative format that achieves the required normalization of logic.

The high-speed automatic parsing of statements, so as to be able to render not only the statement, but also grammatically correct forms of negation, question, postulation ("might") and imperatives ("must" and "must not") from the base statement, and to render the correct substitution of pronouns.

The high-speed automatic harvesting of rules from the native or transformed legislation or policy, using the normalised logical structures and operators; formatting conventions (such as those relating to indentation in legislation) to assist in the identification of nesting logic; the numbering conventions of legislation to assist in the identification of logical structures, and the automatic inclusion of logic based on the numerical structural elements of the legislation (clause numbers, sub-clause numbers, paragraphs etc).

The high-speed automatic creation of an executable rule base from these rules, which can be immediately used (or compiled and used) with an inference engine.

The use of an automatically-generated rule base to enable a range of different automated and semi-automated tests and checks, to assure the quality of the legislation or policy.

The use of a standard assessment of the level of complexity of the legislation or policy, through automated analysis of rule base paths reflecting simple, complex and average applications of the legislation.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A rule based computerized method of developing rule based systems based upon existing rules such as legislation, policy, or other rule sets, the method comprising the steps of:
developing a computerized database containing a set of normalized rules in accordance with which the rule based system can be developed, written, and delivered; and
parsing natural language statements included in the existing rules to automatically generate grammatical forms in the set of normalized rules, wherein the grammatical forms comprise natural language statements reflecting terms of the legislation, policy, or other rule sets, and further comprise positive, negative, uncertain, and question forms of the statements;
wherein the normalized rules are written in accordance with defined constraints to limit the number of logical formats in which the normalized rules can be expressed, and include a conclusion followed by a comprehensive statement of all conditions for success or failure of that conclusion; or a references in the premises associated with the conclusion to one or more sub-conclusions upon which the conclusion is based,
whereby the normalized rules are expressed in a logical format readily understandable to both humans and computers.

2. The rule based computerized method of developing rule based systems as claimed in claim 1, wherein the normalized rules are such that:
the grammatical syntax and semantics of a determinative legislative, policy or rule set provision explicitly reflect an underlying logical structure in a particular and preferred form, and
the syntax of legislative, policy or rule set provisions used for calculating amounts or quantities explicitly reflects calculations and algorithms that have a particular and preferred syntactic structure.

3. The rule based computerized method of developing rule based systems as claimed in claim 2, and including:
utilising the computerized database to develop draft policy for the legislation, policy or rule sets of a rule based system in accordance with the set of normalized rules.

4. The rule based computerized method of developing rule based systems as claimed in claim 3, and including:
utilising the computerized database to parse the draft written in accordance with the normalized rules to check compliance of the draft therewith.

5. The rule based computerized method of developing rule based systems as claimed in claim 2, and including:
utilising the computerized database to automatically transform existing legislation, policy or rule sets of a rule based system into a format consistent with the normalized rules.

6. The rule based computerized method of developing rule based systems as claimed in claim 2, wherein the normalized rules are developed in accordance with at least some of the principles for determinative provisions and principles for calculations substantially as described herein.

7. A rule based computerized method of implementing rule based systems based upon existing rules such as legislation, policy, or other rule sets, the method comprising the steps of:
developing a computerized database containing a set of normalized rules in accordance with which the rule based system can be developed, written, and delivered; and
parsing natural language statements included in the existing rules to automatically generate grammatical forms in the set of normalized rules, wherein the grammatical forms comprise natural language statements reflecting terms of the legislation, policy, or other rule sets, and further comprise positive, negative, uncertain, and question forms of the statements;
wherein the normalized rules are written in accordance with defined constraints to limit the number of logical formats in which the normalized rules can be expressed, and include a conclusion followed by a comprehensive statement of all conditions for success or failure of that conclusion; or a references in the premises associated with the conclusion to one or more sub-conclusions upon which the conclusion is based,
whereby the normalized rules are expressed in a logical format readily understandable to both humans and computers.

8. The rule based computerized method of implementing rule based systems as claimed in claim 7, wherein the normalized rules are such that:
the grammatical syntax and semantics of a determinative legislative, policy or rule set provision explicitly reflect an underlying logical structure in a particular and preferred form, and
the syntax of legislative, policy or rule set provisions used for calculating amounts or quantities explicitly reflects calculations and algorithms that have a particular and preferred syntactic structure.

9. The rule based computerized method of implementing rule based systems as claimed in claim 8, and including:
utilising the computerized database to develop draft policy for the legislation, policy or rule sets of a rule based system in accordance with the set of normalized rules.

10. The rule based computerized method of implementing rule based systems as claimed in claim 9, and including:
utilising the computerized database to parse the draft written in accordance with the normalized rules to check compliance of the draft therewith.

11. The rule based computerized method of implementing rule based systems as claimed in claim 8, and including:
utilising the computerized database to automatically transform existing legislation, policy or rule sets of a rule based system into a format consistent with the normalized rules.

12. The rule based computerized method of implementing rule based systems as claimed in claim 8, wherein the normalized rules are developed in accordance with at least some of the principles for determinative provisions and principles for calculations substantially as described herein.

13. A rule based computerized method of administering rule based systems such as legislation, policy, or other rule sets, the method comprising the steps of:
developing a computerized database containing a set of normalized rules in accordance with which the rule based system can be developed, written, and delivered; and
parsing natural language statements included in the existing rules to automatically generate grammatical forms in the set of normalized rules, wherein the grammatical forms comprise natural language statements reflecting terms of the legislation, policy, or other rule sets, and further comprise positive, negative, uncertain, and question forms of the statements;

wherein the normalized rules are written in accordance with defined constraints to limit the number of logical formats in which the normalized rules can be expressed, and include a conclusion followed by a comprehensive statement of all conditions for success or failure of that conclusion; or a references in the premises associated with the conclusion to one or more sub-conclusions upon which the conclusion is based, whereby the normalized rules are expressed in a logical format readily understandable to both humans and computers.

14. The rule based computerized method of administering rule based systems as claimed in claim 13, wherein the normalized rules are such that:

the grammatical syntax and semantics of a determinative legislative, policy or rule set provision explicitly reflect an underlying logical structure in a particular and preferred form, and the syntax of legislative, policy or rule set provisions used for calculating amounts or quantities explicitly reflects calculations and algorithms that have a particular and preferred syntactic structure.

15. The rule based computerized method of administering rule based systems as claimed in claim 14, and including:

utilising the computerized database to develop draft policy for the legislation, policy or rule sets of a rule based system in accordance with the set of normalized rules.

16. The rule based computerized method of administering rule based systems as claimed in claim 14, and including:

utilising the computerized database to parse the draft written in accordance with the normalized rules to check compliance of the draft therewith.

17. The rule based computerized method of administering rule based systems as claimed in claim 14, and including:

utilising the computerized database to automatically transform existing legislation, policy or rule sets of a rule based system into a format consistent with the normalized rules.

18. The rule based computerized method of administering rule based systems as claimed in claim 14, wherein the normalized rules are developed in accordance with at least some of the principles for determinative provisions and principles for calculations substantially as described herein.

19. The rule based computerized method of developing rule based systems as claimed in claim 3, and including the step of:

utilising the computerized database to write draft legislation, policy or rule sets in accordance with the set of normalized rules.

20. The rule based computerized method of developing rule based systems as claimed in claim 9, and including the step of:

utilising the computerized database to write draft legislation, policy or rule sets in accordance with the set of normalized rules.

21. The rule based computerized method of developing rule based systems as claimed in claim 15, and including the steps of:

utilising the computerized database to write draft legislation, policy or rule sets in accordance with the set of normalized rules.

\* \* \* \* \*